US011263645B2

(12) United States Patent
O'Sullivan et al.

(10) Patent No.: US 11,263,645 B2
(45) Date of Patent: *Mar. 1, 2022

(54) AGGREGATE SCORING OF TAGGED CONTENT ACROSS SOCIAL BOOKMARKING SYSTEMS

(71) Applicant: Airbnb, Inc., San Francisco, CA (US)

(72) Inventors: Patrick J. O'Sullivan, Dublin (IE); Edith H. Stern, Yorktown Heights, NY (US); Robert C. Weir, Westford, MA (US); Barry E. Willner, Briarcliff Manor, NY (US)

(73) Assignee: Airbnb, Inc., San Francisco, CA (US)

( * ) Notice: Subject to any disclaimer, the term of this patent is extended or adjusted under 35 U.S.C. 154(b) by 522 days.

This patent is subject to a terminal disclaimer.

(21) Appl. No.: 16/216,891

(22) Filed: Dec. 11, 2018

(65) Prior Publication Data

US 2019/0108534 A1 Apr. 11, 2019

Related U.S. Application Data

(63) Continuation of application No. 11/947,102, filed on Nov. 29, 2007, now Pat. No. 10,152,721.

(51) Int. Cl.
*G06F 17/00* (2019.01)
*G06F 7/00* (2006.01)
(Continued)

(52) U.S. Cl.
CPC ......... *G06Q 30/02* (2013.01); *G06F 16/9562* (2019.01)

(58) Field of Classification Search
CPC .......................... G06Q 30/02; G06F 16/9562
(Continued)

(56) References Cited

U.S. PATENT DOCUMENTS 5,754,938 A * 5/1998 Herz .................... G06Q 20/383
725/116
6,963,850 B1 * 11/2005 Bezos .................... G06Q 30/02
705/7.29

(Continued)

OTHER PUBLICATIONS

IBM: List of IBM Patents or Patent Applications Treated as Related (Appendix P),Mar. 25, 2020, pp. 1-2.

(Continued)

*Primary Examiner* — Pavan Mamillapalli
(74) *Attorney, Agent, or Firm* — Schwegman Lundberg & Woessner, P.A.

(57) ABSTRACT

Embodiments of the present invention address deficiencies of the art in respect to social bookmarking and provide a method, system and computer program product for aggregating scoring of tagged content across social bookmarking systems. In an embodiment of the invention, a method for aggregating scoring of tagged content across social bookmarking systems can be provided. The method can include combining tag scores for a tag in content across multiple different social bookmarking systems into a single aggregate tag score and applying the single aggregate tag score to the tag in the content. In this regard, combining tag scores for a tag in content across multiple different social bookmarking systems into a single aggregate tag score can include computing either a simple or a weighted average of the tag scores for the tag to produce the single aggregate score.

19 Claims, 1 Drawing Sheet

(51) Int. Cl.
  *G06Q 30/02* (2012.01)
  *G06F 16/955* (2019.01)
(58) Field of Classification Search
  USPC .......................................................... 707/737
  See application file for complete search history.

(56) References Cited

U.S. PATENT DOCUMENTS

| | | | |
|---|---|---|---|
| 7,493,294 B2* | 2/2009 | Flinn ...................... | G06N 3/126 706/12 |
| 7,548,922 B2 | 6/2009 | Altaf et al. | |
| 7,668,821 B1* | 2/2010 | Donsbach ........... | G06F 16/9535 707/765 |
| 7,747,937 B2* | 6/2010 | Rojer .................. | G06F 16/9562 715/206 |
| 7,756,924 B2* | 7/2010 | Kaier .................... | H04L 67/104 709/204 |
| 7,805,431 B2 | 9/2010 | Siegel | |
| 7,885,986 B2* | 2/2011 | Anderson ........... | G06F 16/9562 707/805 |
| 7,949,659 B2 | 5/2011 | Chakrabarti | |
| 8,260,787 B2 | 9/2012 | Lam | |
| 8,554,783 B2* | 10/2013 | Safo ........................ | G06F 16/38 707/765 |
| 9,245,271 B1 | 1/2016 | Ahmed | |
| 10,152,721 B2 | 12/2018 | O'Sullivan | |
| 2002/0062368 A1* | 5/2002 | Holtzman ............... | G06F 21/31 709/224 |
| 2006/0277091 A1* | 12/2006 | Kochikar ............... | G06Q 10/10 705/7.14 |
| 2007/0067331 A1* | 3/2007 | Schachter .......... | G06Q 30/0263 |
| 2007/0124208 A1 | 5/2007 | Schachter | |
| 2008/0046458 A1 | 2/2008 | Tseng et al. | |
| 2008/0091797 A1 | 4/2008 | Busey | |
| 2008/0104032 A1 | 5/2008 | Sarkar | |
| 2008/0104172 A1* | 5/2008 | Craig ..................... | H04L 67/38 709/204 |
| 2008/0114778 A1 | 5/2008 | Siegel | |
| 2008/0154949 A1* | 6/2008 | Brooks ............... | G06F 16/9562 |
| 2009/0006373 A1 | 1/2009 | Chakrabarti | |
| 2009/0006398 A1 | 1/2009 | Lam | |
| 2009/0043781 A1 | 2/2009 | Kim et al. | |
| 2009/0144254 A1 | 6/2009 | Osullivan et al. | |

OTHER PUBLICATIONS

"U.S. Appl. No. 11/947,102, Non Final Office Action dated Jan. 19, 2010", 15 pgs.
"U.S. Appl. No. 11/947,102, Response filed Apr. 16, 2010 to Non Final Office Action dated Jan. 19, 2010", 6 pgs.
"U.S. Appl. No. 11/947,102, Non Final Office Action dated Jun. 10, 2010", 18 pgs.
"U.S. Appl. No. 11/947,102, Response filed Sep. 9, 2010 to Non Final Office Action dated Jun. 10, 2010", 14 pgs.
"U.S. Appl. No. 11/947,102, Final Office Action dated Nov. 19, 2010", 28 pgs.
"U.S. Appl. No. 11/947,102, Appeal Brief filed Apr. 18, 2011", 18 pgs.
"U.S. Appl. No. 11/947,102, Non Final Office Action dated Jun. 29, 2011", 34 pgs.
"U.S. Appl. No. 11/947,102, Response filed Sep. 27, 2011 to Non Final Office Action dated Jun. 29, 2011", 13 pgs.
"U.S. Appl. No. 11/947,102, Final Office Action dated Nov. 15, 2011", 37 pgs.
"U.S. Appl. No. 11/947,102, Appeal Brief filed Apr. 16, 2012", 17 pgs.
"U.S. Appl. No. 11/947,102, Non Final Office Action dated Jun. 27, 2012", 37 pgs.
"U.S. Appl. No. 11/947,102, Response filed Sep. 5, 2012 to Non Final Office Action dated Jun. 27, 2012", 13 pgs.
"U.S. Appl. No. 11/947,102, Final Office Action dated Nov. 30, 2012", 36 pgs.
"U.S. Appl. No. 11/947,102, Appeal Brief filed Mar. 18, 2013", 18 pgs.
"U.S. Appl. No. 11/947,102, Examiner's Answer to Appeal Brief mailed Jun. 3, 2013", 35 pgs.
"U.S. Appl. No. 11/947,102, Reply Brief filed Jul. 29, 2013", 6 pgs.
"U.S. Appl. No. 11/947,102, Decision on Appeal mailed Nov. 20, 2015", 8 pgs.
"U.S. Appl. No. 11/947,102, Response filed Jan. 20, 2016 to Decision on Appeal mailed Nov. 20, 2015", 16 pgs.
"U.S. Appl. No. 11/947,102, Non Final Office Action dated Feb. 12, 2016", 8 pgs.
"U.S. Appl. No. 11/947,102, Response filed May 12, 2016 to Non Final Office Action dated Feb. 12, 2016", 18 pgs.
"U.S. Appl. No. 11/947,102, Notice of Allowance dated Jun. 2, 2016", 10 pgs.
"U.S. Appl. No. 11/947,102, Final Office Action dated Jul. 28, 2016", 11 pgs.
"U.S. Appl. No. 11/947,102, Response filed Sep. 28, 2016 to Final Office Action dated Jul. 28, 2016", 19 pgs.
"U.S. Appl. No. 11/947,102, Advisory Action dated Oct. 27, 2016", 3 pgs.
"U.S. Appl. No. 11/947,102, Examiner Interview Summary dated Nov. 17, 2016", 3 pgs.
"U.S. Appl. No. 11/947,102, Non Final Office Action dated Mar. 17, 2017", 10 pgs.
"U.S. Appl. No. 11/947,102, Response filed Jun. 19, 2017 to Non Final Office Action dated Mar. 17, 2017", 20 pgs.
"U.S. Appl. No. 11/947,102, Final Office Action dated Sep. 18, 2017", 10 pgs.
"U.S. Appl. No. 11/947,102, Response filed Dec. 18, 2017 to Final Office Action dated Sep. 18, 2017", 20 pgs.
"U.S. Appl. No. 11/947,102, Advisory Action dated Jan. 5, 2018", 10 pgs.
"U.S. Appl. No. 11/947,102, Response filed Jan. 18, 2018 to Advisory Action dated Jan. 5, 2018", 20 pgs.
"U.S. Appl. No. 11/947,102, Non Final Office Action dated Apr. 3, 2018", 15 pgs.
"U.S. Appl. No. 11/947,102, Response filed Jul. 3, 2018 to Non Final Office Action dated Apr. 3, 2018", 19 pgs.
"U.S. Appl. No. 11/947,102, Notice of Allowance dated Aug. 2, 2018", 11 pgs.

\* cited by examiner

US 11,263,645 B2

AGGREGATE SCORING OF TAGGED CONTENT ACROSS SOCIAL BOOKMARKING SYSTEMS

CROSS-REFERENCE TO RELATED APPLICATIONS

This application is a Continuation of U.S. patent application Ser. No. 11/947,102, filed Nov. 29, 2007, the entirety of which is incorporated herein by reference.

BACKGROUND OF THE INVENTION

Field of the Invention

The present invention relates to the field of social bookmarking and more particularly to scoring tags in a social bookmarking system.

Description of the Related Art

Content browsing refers to the retrieval and presentation of electronic content in a browser client. Content generally can include electronic documents, messages, audio, audio-visual and video materials and imagery. Most commonly, content can be stored in a server environment and published for access by content consumers over a computer communications network such as the global Internet. Content consumers, in turn, can retrieve content over the network by reference to a network address for the content. Once retrieved, the content can be presented in a browser client including not only conventional visual browsers such as the venerable Web browser, but also in alternative browsers such as those deployed in pervasive devices and those supporting different modes of presentation such as the audible presentation of material. In other cases the content can be a physical object, like a book, and content browsing can retrieve the physical location of the book, for example in a library or other information associated with the object.

Given the vast amount of content published for accessibility over the Internet, modern content browsers provide a mechanism for ably retrieving previously accessed content. Known as a "bookmark" or "favorite" (collectively referred to as a bookmark), end users can record content of interest as a bookmark. Subsequently, end users can access a list of bookmarks in order to recall the content of interest without being compelled to recall from memory the precise uniform resource indicator (URI) for the content of interest.

While bookmarking reflects the personal experience of individual users, social bookmarking provides a foundation for users within a social group to store, organize, share and search the bookmarks collectively established by the users within the social group. In operation, a social bookmarking system, users save links to memorable content. Unlike traditional bookmarks however, in a social bookmarking system the links subsequently can be published for public inspection and use, so as to provide a communal repository of bookmarks. Consequently, groups of the users can access the links encapsulated within respective social bookmarks, though the groups of users in fact may never have viewed the associated content—a prerequisite for a traditional bookmark.

Social bookmarking services often encourage users in a social network to annotate bookmarks with meta-information rather than merely storing bookmarks in a traditional file hierarchy. One such type of meta-information is a simple descriptive text label referred to in the art as a "tag". As such, users processing annotations for a social bookmark can view the social bookmark for content along with meta-information pertaining to the bookmark, for instance the number of users having bookmarked the content. Further, some social bookmarking services infer clusters of bookmarks from the relationship of corresponding annotations. Finally, many social bookmarking services provide subscription based feeds for lists of bookmarks, including lists organized by annotations. Consequently, subscribers can become aware of new bookmarks as the bookmarks are saved, shared, and annotated by other users.

The visual display of social bookmarks can be reflected in the display of the tags used within the social bookmarking site The visual display of the tags can vary according to the number of users in a social network who have bookmarked the corresponding content with that same tag. In particular, tag clouds often include tags with a font size commensurate with a number of users in the social network whom have bookmarked the corresponding content with that same tag. In this way, a visual glance of the content will indicate which aspects of the content are most interesting to the social network at large as the font size of the different words in the content will vary relative to the other words according to the popularity of the different words.

The visual display of tags can also vary according to the overall number of uses of a particular tag across the entire social bookmarking site. In this regard, tag clouds can be used to indicate which topics are most prominent in the entire site.

As tagging of Web content becomes more popular and pervasive, it can be problematic in determining how to represent the knowledge of multiple tagging systems so that the wisdom of crowds is represented by an aggregate scoring of the wisdom of multiple crowds across different social bookmarking system. These multiple crowds may represent multiple crowds in a single company, or indeed individuals on other servers in different companies or shared spaces. In situations where end users desire an ability to use multiple bookmarking systems, there is no means today to aggregate this content with a view towards combined normalized scoring of tags.

BRIEF SUMMARY OF THE INVENTION

Embodiments of the present invention address deficiencies of the art in respect to social bookmarking and provide a novel and non-obvious method, system and computer program product for aggregating scoring of tagged content across social bookmarking systems. In an embodiment of the invention, a method for aggregating scoring of tagged content across social bookmarking systems can be provided. The method can include combining tag scores for a tag in content across multiple different social bookmarking systems into a single aggregate tag score and applying the single aggregate tag score to the tag in the content. In this regard, combining tag scores for a tag in content across multiple different social bookmarking systems into a single aggregate tag score can include computing either a simple or a weighted average of the tag scores for the tag to produce the single aggregate score.

In another embodiment of the invention, a social bookmarking data processing system can be provided. The system can include multiple different social bookmarking systems coupled to multiple different browser clients over a computer communications network. The system further can include score aggregation logic executing in a host server coupled to the social bookmarking systems and the browser clients. The logic can include program code enabled to combine tag scores for a tag in content across multiple different social bookmarking systems into a single aggregate tag score, and to apply the single aggregate tag score to the tag in the content. In this regard, the single aggregate tag score can be a simple average of the tags scores for the tag from the different social bookmarking systems, or the single aggregate tag score can be a weighted average of the tags scores for the tag from the different social bookmarking systems.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for aggregating scoring of tagged content across social bookmarking systems. In accordance with an embodiment of the present invention, the scores for a tag in content from multiple different social bookmarking systems can be combined into an aggregated score and reflected in the content, for example as a tag cloud. For example, the aggregated score can be an average score amongst the different social bookmarking systems for the tag, or the aggregated score can be weighted according to a number of samples received in each of the different social bookmarking system. Optionally, different social bookmarking systems can be included in the aggregation according to administrator preference, user preference or both.

Figure 1:
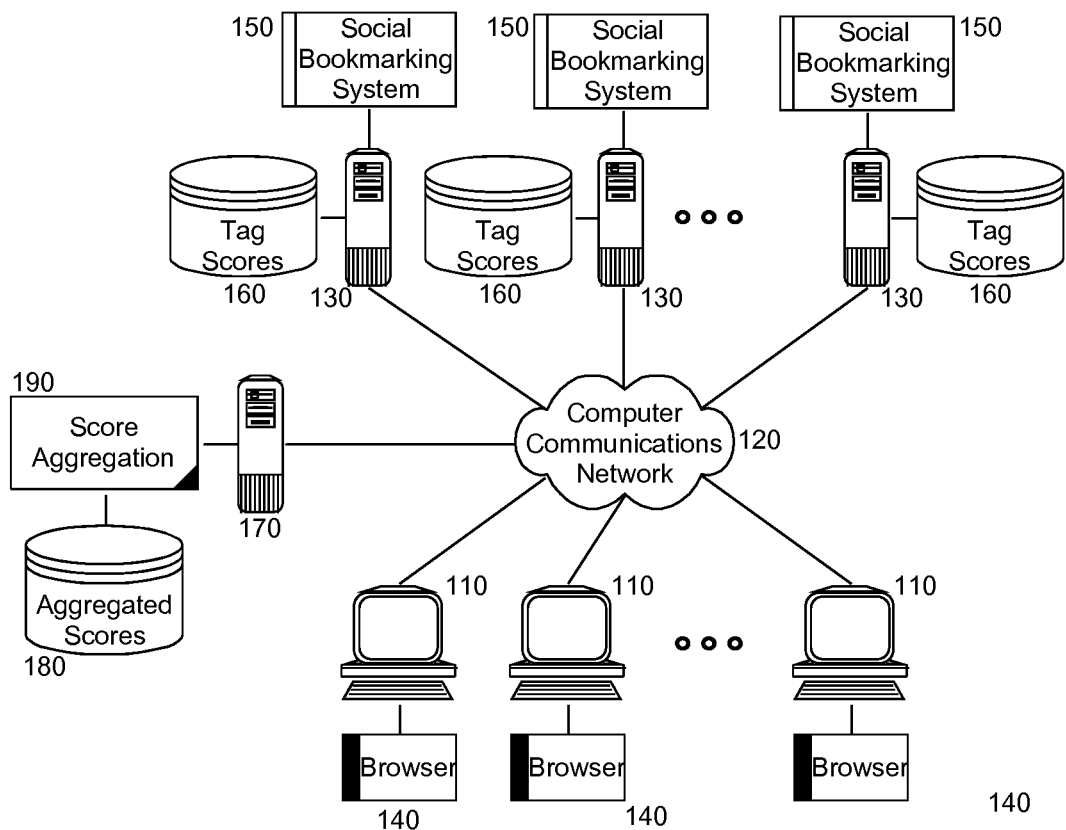
FIG. 1 is a schematic illustration of a social bookmarking data processing system configured for aggregating scoring of tagged content; and, FIG. 2 is a flow chart illustrating a process for aggregating scoring of tagged content across social bookmarking systems.

In further illustration, FIG. 1 schematically depicts a social bookmarking data processing system configured for aggregating scoring of tagged content The system can include multiple different social bookmarking servers 130 with corresponding social bookmarking systems 150 configured for coupling to multiple different content clients 110 with respective content browsers 140 over computer communications network 120. Each social bookmarking system 150 can measure a frequency of tagging content as a social bookmark within a corresponding social network. The measured frequency can include a number of tags applied to all content and a number of tags applied for particular content. The measured frequency further can be stored within a data store of tag scores 160.

Notably, a host server 170 can be coupled to each of the social bookmarking servers 130 and the clients 110 over the computer communications network. The host server 170 can include score aggregation logic 190 coupled to a data store of aggregated scores 180. The logic 190 can include program code enabled to aggregate different scores for the same tag from each of the different social bookmarking systems 150 into a single aggregated score for the tag. The program code of the score aggregation logic 190 further can be enabled to provide the aggregated score to the different clients for visual presentation within the respective content browsers 140, for instance as a tag cloud.

Figure 2:
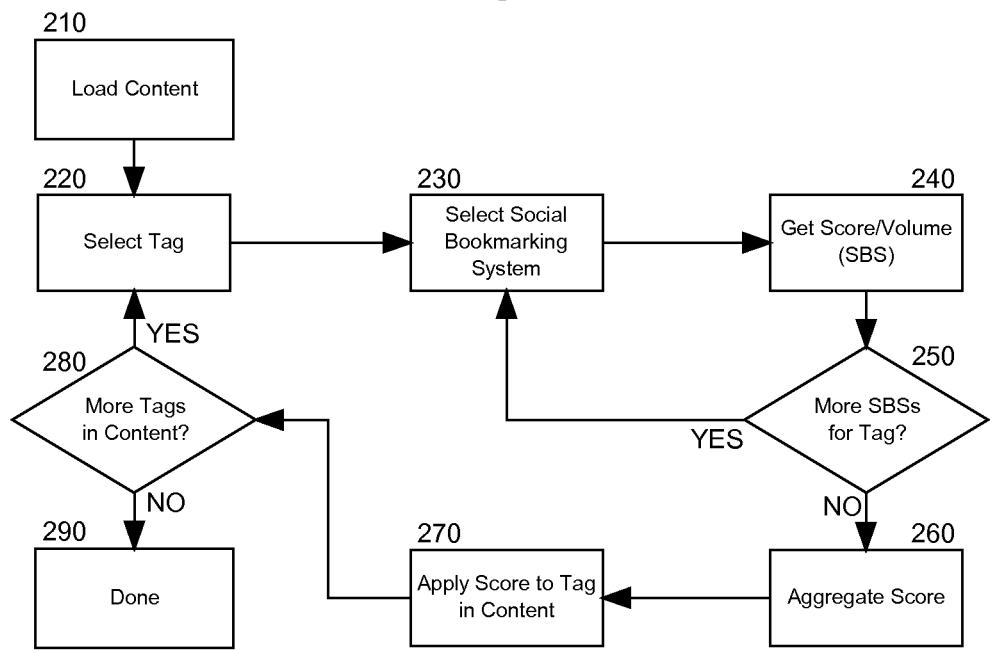

In further illustration of the operation of the score aggregation logic 190, FIG. 2 is a flow chart illustrating a process for aggregating scoring of tagged content across social bookmarking systems. Beginning in block 210 content for a page can be loaded and in block 220 a tag within the content can be selected for processing. In block 230 a first contributing social bookmarking system can be selected and in block 240 the score and frequency data for the tag can be retrieved. In this regard, the score can include a number of users of the social bookmarking system having applied the tag and a number of tags applied by all users of the social bookmarking system.

In decision block 250 if additional social bookmarking systems remain to be processed, the process can repeat through block 230 for a next social bookmarking system. Optionally, the number and nature of the social bookmarking systems considered for aggregation can be limited by an administrator or by the end users. For instance, users in one geographic region can enjoy one set of social bookmarking systems which may differ from users in other geographic regions. Access control further can be applied to the end users in determining which end users can aggregate tag scores from which social bookmarking systems.

In decision block 250, when no further social bookmarking systems remain to be considered, in block 260 the tag scores collected from the different social bookmarking systems can be combined into an aggregate score for the tag. In this regard, the aggregate score can be a simple average of the tag scores from each social bookmarking system, or the aggregate score can be a weighted average based upon the volume of tags applied in each social bookmarking system. In any event, in block 270 the aggregate score can be applied to the tag in the content and visually presented accordingly, for example in a tag cloud. In decision block 280, if additional tags remain to be processed in the content, the process can continue in block 220 with the selection of a different tag. Otherwise, the process can end in block 290.

Notably the process described herein can occur upon detecting a change in the tag scores in the different social bookmarking systems, or the process can be performed in batch during off hours at a scheduled interval. Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for aggregating scoring of tagged content across social bookmarking systems, the method comprising:
   obtaining, by a processor of a server, a tag score measuring a frequency of a tag for content within a corresponding social network associated with a particular social bookmarking system executing in a corresponding social bookmarking server, where the measured frequency of the tag indicates a number of tags applied to all content in the particular social bookmarking system and a number of tags applied to particular content in the particular social bookmarking system, the particular social bookmarking system providing a communal repository of bookmarks;
   combining, by the processor of the server, tag scores for the tag across multiple different social bookmarking systems into a single aggregate tag score after obtaining tag scores for the tag across the multiple different social bookmarking systems, where each different social bookmarking system executes in a corresponding social bookmarking server and is also configured for coupling to multiple different computing clients with respective content browsers; and,
   visually presenting, by the processor of the server, the single aggregate tag score within a respective content browser.

2. The method of claim 1, wherein
   the combining comprises computing a simple average of the tag scores for the tag to produce the single aggregate score.

3. The method of claim 1, wherein
   the combining comprises computing a weighted average of the tag scores for the tag to produce the single aggregate score.

4. The method of claim 1, wherein
   the multiple different social bookmarking systems are within an administrator specified set of different social bookmarking systems.

5. The method of claim 1, wherein
   the multiple different social bookmarking systems are within an end user specified set of different social bookmarking systems.

6. The method of claim 1, further comprising:
   again performing the combining and also the presenting in response to a change in the tag score in at least one of the social bookmarking systems.

7. The method of claim 1, further comprising:
   performing the combining and the presenting at a periodic interval.

8. The method of claim 1, wherein
   the presenting comprises visually rendering the tag as a tag cloud according to the single aggregate tag.

9. A computer program product comprising a non-transitory computer usable storage medium having stored therein computer usable program code for aggregating scoring of tagged content across social bookmarking systems, the computer usable program code, which when executed by a computer hardware system, causing the computer hardware system to perform:
   obtaining a tag score measuring a frequency of a tag for content within a corresponding social network associated with a particular social bookmarking system executing in a corresponding social bookmarking server, where the measured frequency of the tag indicates a number of tags applied to all content in the particular social bookmarking system and a number of tags applied to particular content in the particular social bookmarking system, the particular social bookmarking system providing a communal repository of bookmarks;
   combining tag scores for the tag across multiple different social bookmarking systems into a single aggregate tag score after obtaining tag scores for the tag across the multiple different social bookmarking systems, where each different social bookmarking system executes in a corresponding social bookmarking server and is also configured for coupling to multiple different computing clients with respective content browsers; and,
   visually presenting, within a respective content browser, the single aggregate tag score.

10. The computer program product of claim 9, wherein
    the combining comprises computing a simple average of the tag scores for the tag to produce the single aggregate score.

11. The computer program product of claim 9, wherein
    the combining comprises computing a weighted average of the tag scores for the tag to produce the single aggregate score.

12. The computer program product of claim 9, wherein
    the multiple different social bookmarking systems are within an administrator specified set of different social bookmarking systems.

13. The computer program product of claim 9, wherein
    the multiple different social bookmarking systems are within an end user specified set of different social bookmarking systems.

14. The computer program product of claim 9, wherein the computer usable program code further causes the computer hardware system to perform:

again performing the combining and also the presenting in response to a change in the tag score in at least one of the social bookmarking systems.

15. The computer program product of claim 9, wherein the computer usable program code further causes the computer hardware system to perform:

performing the combining and the presenting at a periodic interval.

16. The computer program product of claim 9, wherein the presenting comprises visually rendering the tag as a tag cloud according to the single aggregate tag.

17. A system for aggregating scoring of tagged content across social bookmarking systems, the system comprising:

one or more computer processors; and
one or more non-transitory computer-readable mediums storing instructions that, when executed by the one or more computer processors, cause the system to perform operations comprising:

obtaining a tag score measuring a frequency of a tag for content within a corresponding social network associated with a particular social bookmarking system executing in a corresponding social bookmarking server, where the measured frequency of the tag indicates a number of tags applied to all content in the particular social bookmarking system and a number of tags applied to particular content in the particular social bookmarking system, the particular social bookmarking system providing a communal repository of bookmarks;

combining, by the processor of the server, tag scores for the tag across multiple different social bookmarking systems into a single aggregate tag score after obtaining tag scores for the tag across the multiple different social bookmarking systems, where each different social bookmarking system executes in a corresponding social bookmarking server and is also configured for coupling to multiple different computing clients with respective content browsers; and, visually presenting, by the processor of the server, the single aggregate tag score within a respective content browser.

18. The system of claim 17, wherein the combining comprises computing a simple average of the tag scores for the tag to produce the single aggregate score.

19. The system of claim 17, wherein the combining comprises computing a weighted average of the tag scores for the tag to produce the single aggregate score.

* * * * *